(12) United States Patent
Visvanathan et al.

(10) Patent No.: US 9,933,961 B1
(45) Date of Patent: Apr. 3, 2018

(54) METHOD TO IMPROVE THE READ PERFORMANCE IN A DEDUPLICATED STORAGE SYSTEM

(71) Applicant: EMC IP Holding Company LLC, Hopkinton, MA (US)

(72) Inventors: Satish Visvanathan, San Jose, CA (US); Debasish Garai, Cupertino, CA (US); Yamini Allu, Santa Clara, CA (US); Balaji Subramanian, Fremont, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 2 days.

(21) Appl. No.: 15/280,966

(22) Filed: Sep. 29, 2016

(51) Int. Cl.
*G06F 12/00* (2006.01)
*G06F 3/06* (2006.01)
*G06F 12/0802* (2016.01)
*G06F 12/0868* (2016.01)
*G06F 12/0866* (2016.01)

(52) U.S. Cl.
CPC .......... *G06F 3/0619* (2013.01); *G06F 3/0608* (2013.01); *G06F 3/0629* (2013.01); *G06F 3/0641* (2013.01); *G06F 3/0683* (2013.01); *G06F 12/0802* (2013.01); *G06F 12/0866* (2013.01); *G06F 12/0868* (2013.01); *G06F 2212/60* (2013.01)

(58) Field of Classification Search
CPC .... G06F 3/0619; G06F 3/0629; G06F 3/0683; G06F 3/0608; G06F 3/0641; G06F 12/0802; G06F 3/0866; G06F 12/0868; G06F 2212/60
See application file for complete search history.

(56) References Cited

U.S. PATENT DOCUMENTS

| 8,468,320 | B1 * | 6/2013 | Stringham | G06F 3/0608 707/610 |
| 9,336,143 | B1 * | 5/2016 | Wallace | G06F 12/121 |
| 9,342,253 | B1 * | 5/2016 | Muthukkaruppan | G06F 3/0641 |

* cited by examiner

*Primary Examiner* — Shawn X Gu
(74) *Attorney, Agent, or Firm* — Peter Jovanovic; Theodore A. Chen; Krishnendu Gupta

(57) ABSTRACT

A method, article of manufacture, and apparatus for backup operations. A read request is received for a data segment at a deduplicated storage system. The data segment is determined not to be in a data cache on the deduplicated storage system. A data segment reference for the data segment is determined to be in a data segment reference cache on the deduplicated storage system. The data segment is read from a persistent storage using the data segment reference.

3 Claims, 5 Drawing Sheets

METHOD TO IMPROVE THE READ PERFORMANCE IN A DEDUPLICATED STORAGE SYSTEM

FIELD OF THE INVENTION

This invention relates generally to data storage, and more particularly to systems and methods for optimizing backup operations.

BACKGROUND OF THE INVENTION

Primary storage systems may contain large amounts of business critical data. If a primary storage system fails, it may be beneficial to have an additional copy of this data available for recovery. This additional copy may be a data backup, and may be stored on a separate backup storage system.

There is a need, therefore, for an improved method, article of manufacture, and apparatus for optimizing data backups.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
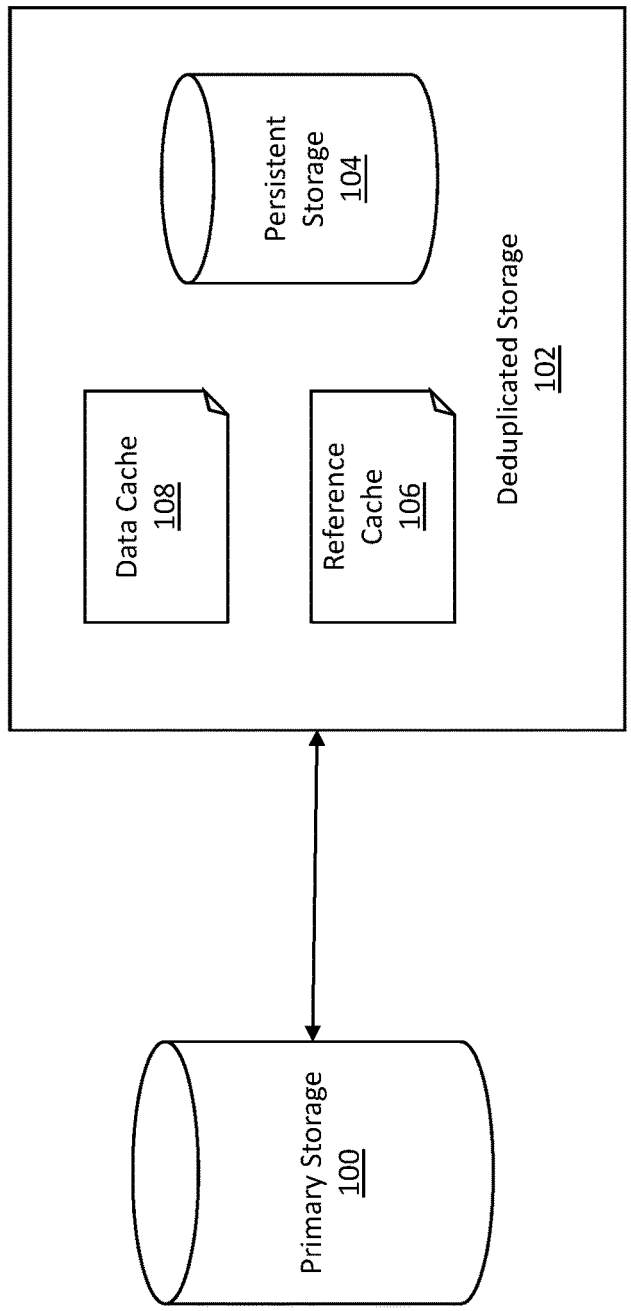
FIG. 1 depicts a system for optimizing data backups consistent with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

The systems and methods discussed herein may provide an efficient mechanism for backing up data from a primary storage system to a deduplicated storage system. In some embodiments, a full backup is taken of the primary storage system and stored on the deduplicated storage system. This full backup may be stored and managed using a tree structure, such as a merkle tree. Managing the backup in a tree structure may, however, present challenges as incremental backups are taken from the primary storage system. The present disclosure provides a caching mechanism to overcome these and other challenges.

Turning now to FIG. 1, a system consistent with an embodiment of the present disclosure is discussed. The system includes primary storage 100 and deduplicated storage 102. In an embodiment, primary storage 100 may be any storage system used to store and manage data. For example, primary storage 100 may be a storage array and/or appliance, a storage area network ("SAN"), a client system, a general purpose computer, or any other hardware and/or software system capable of storing data. In some embodiments, deduplicated storage 102 may comprise a deduplicated storage device for persistently storing data backups. These data backups may be received from primary storage 100, and may comprise all or a subset of the data on storage device 100. The data backups may comprise a full backup, meaning a complete backup of everything on the system, or they may comprise an incremental backup, meaning only data that has changed since a previous backup was taken.

Deduplicated storage 102 may include reference cache 106, persistent storage 104, and data cache 108. Reference cache 106 may improve data read and/or write operations by caching data segment references, as discussed below. Persistent storage 104 may be the physical and/or logical device used to persistently store the backups. For example, persistent storage 104 may comprise a hard disk drive ("HDD"), solid state drive ("SSD"), or the logical address of an external storage, such as a SAN. Data cache 108 may comprise a cache the temporarily stores copies of data segments for rapid retrieval, as discussed in detail below.

Figure 2:
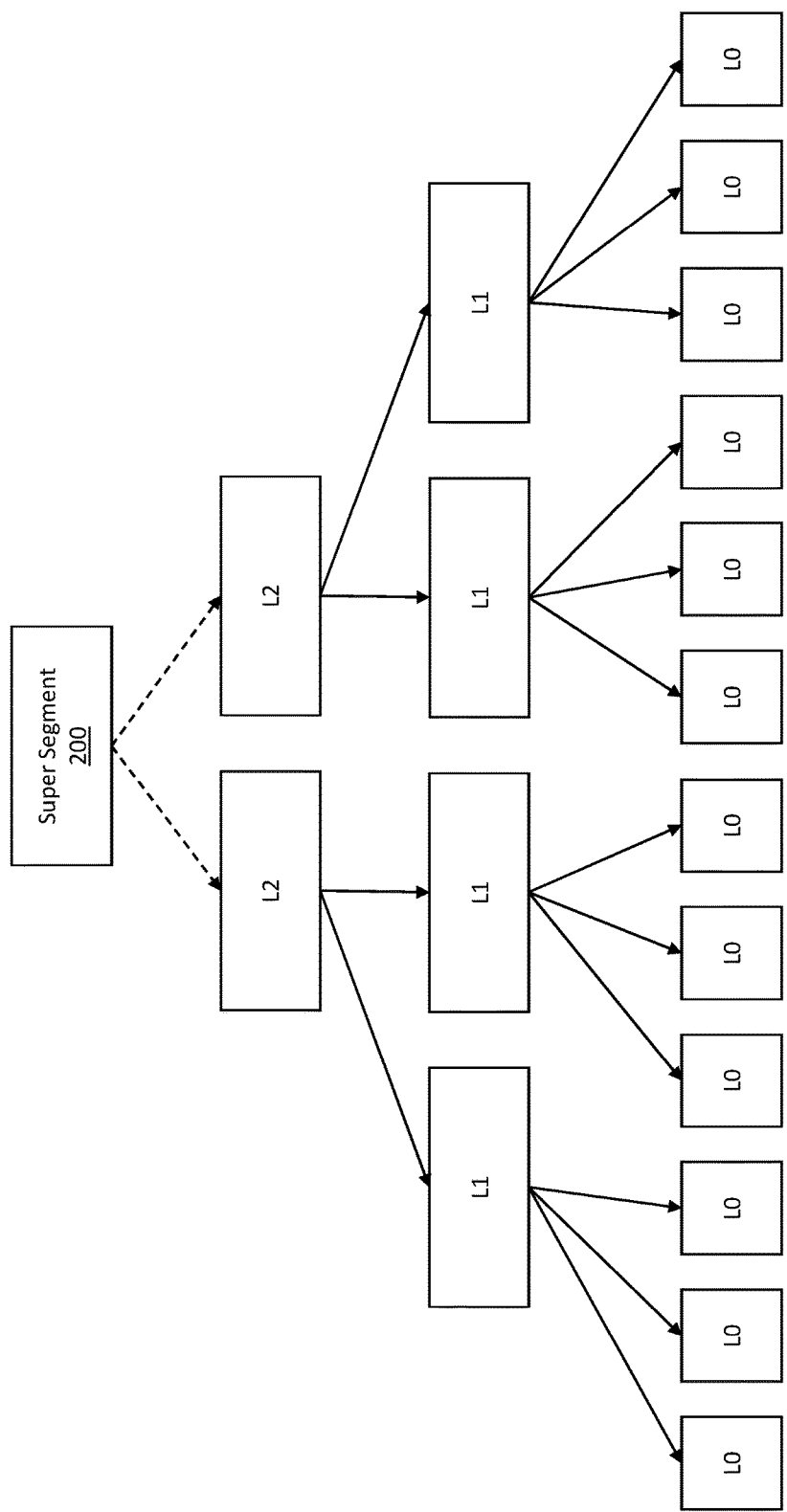
FIG. 2 depicts a tree structure for managing data backups consistent with an embodiment of the present disclosure.

Turning now to FIG. 2, a tree structure for maintaining data backups is discussed. In some embodiments, the tree structure may comprise a merkle tree or a hash tree. The tree structure may be stored on persistent storage 104, and may be associated with a particular backup from primary storage system 100.

In some embodiments, backups from the primary storage system may be divided into data segments. These data segments may be stored in the leaf nodes of the tree structure; such as leaf nodes L0. Parent nodes may be used to locate these leaf nodes, either for data recovery or to update them in response to an incremental backup. For example, parent nodes L1 may comprise references to leaf nodes L0. Similarly, parent nodes L2 may comprise references to the L1 nodes. These references may continue for any number of levels (e.g L3, L4, etc) up to super segment 200. Super segment 200 may comprise the root of the tree. In some embodiments, super segment 200 may comprise the namespace for the backup used during backup and/or recovery operations.

In some embodiments, the nodes may reference their children using hashes. For example, the L0 references stored in an L1 node may comprise a hash of the segment data. Similarly, the L1 reference stored in an L2 node may comprise a hash of a concatenation of all the L0 fingerprints stored in the L1 node. These identifiers could be calculated as the tree is created.

In some embodiments, the tree structure for a given backup is created from the bottom up the first time the full backup is taken. For example, all of the L0 nodes will be created first, followed by all of the L1 nodes, etc. Once the full backup is complete, however, deduplicated storage 102 may begin receiving incremental backups. For example, deduplicated storage 102 may only receive data that has changed since the last backup was taken. This could occur using a changed block tracking ("CBT") mechanism on primary storage 100. While incremental backups may reduce processing time at primary storage 100 and latency over the communication between the primary storage and the deduplicated storage, these incremental backups may present a challenge to deduplicated storage 102.

In order to process the incremental changes received from primary storage 100, deduplicated storage 102 may need to traverse the entire tree structure to locate the L0 segments that have changed. Once located and/or stored, the L1 nodes need to be updated with references to the new L0 segments. As a result, the deduplicated storage may need to traverse the entire tree structure for each changed data segment. If the number of L1 nodes is large, resources may not permit them to be retained in memory. As a result, the L1 nodes may need to be loaded from a HDD every time one of their L0 children is updated. This may result in a performance bottleneck at the deduplicated storage. For example, one embodiment may include 25 k L1 nodes, each with a reference to 512 L0 children. Memory constraints may prevent all of the L1 nodes to be loaded into memory for rapid processing. The present disclosure presents a reference cache which may alleviate this bottleneck.

Turning back to FIG. 1, reference cache 106 may be used to cache data segment fingerprints and data segment offsets from primary storage 100 to improve processing on deduplicated storage 102. Once cached, deduplicated storage 102 may inform primary storage 100 that the write was successful. Deduplicated storage may then update the tree structure discussed in FIG. 2 in the background, thereby alleviating the performance bottle neck. In some embodiments, the reference cache may comprise a data structure which may be rapidly traversed, such as a red/black tree.

Figure 3A:
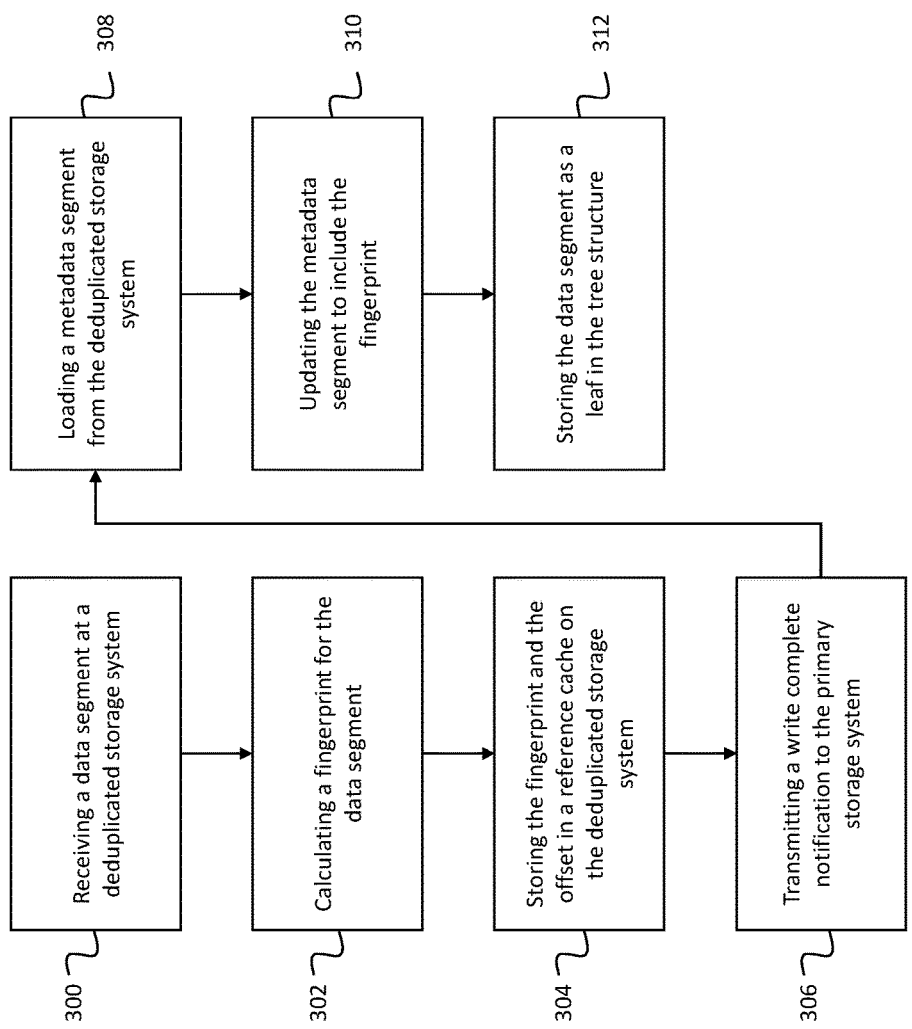
FIG. 3A depicts a process for optimizing data backups consistent with an embodiment of the present disclosure.

Turning now to FIG. 3, a process for managing the reference cache and/or optimizing incremental backups is discussed.

A block 300, a data segment may be received at the deduplicated storage from the primary storage system. In some embodiments, the data segment may comprise new data overwriting previous data on the primary storage system. As a result, the backed up data may be obsolete and need to be replaced. This could occur, for example, as edits are made to a file, and the new data may be identified using CBT on the primary storage system. In an embodiment, the data segments may be anchored at 8 kb. Additionally, the deduplicated storage may receive the offset from the primary storage system with the new data segment, where the offset identifies a location within the deduplicated storage and/or tree structure where the data segment was written.

As noted in reference to FIG. 2, the new data segment may be stored in an L0 leaf node and all of the parent nodes may be updated accordingly. This may, however, create a performance bottleneck as the L0 node is located and parent nodes are individually loaded from persistent storage. The process discussed herein overcome this constraint.

At block 302, a fingerprint may be calculated for the new data segment. For example, the data segment may be hashed and receive a hash fingerprint. The data segment may be stored in persistent storage using a segment store, such as a hash table, where the fingerprint is the key and the segment data is the value. This enables persistent storage of the segment while the tree structure is being updated and for other persistent storage purposes.

At block 304, the fingerprint and the offset may be stored in a reference cache on the deduplicated storage system. For example, a reference cache entry comprising {offset; finger_print} may be stored in reference cache 106. As soon as the entry is created, a write complete notification may be transmitted to the primary storage system at block 306. The primary storage may therefor believe the backup was successful and continue with other processes.

In some embodiments, metadata segments may be loaded from the deduplicated storage system at block 308. For example, the L1 nodes identifying the L0 nodes for storing the data segment may be identified. In some embodiments, the L1 segments are on a persistent storage and loading them may comprise a read operation. In some embodiments, the L1 segment may be located using the following equation, where each L1 segment references 512 L0 nodes, each data segment stored at the L0 node is 8 kb in size, the offset is retrieved from the reference cache:

$$\text{int(offset/4 MB)}*4 \text{ MB}=\text{L1 Index}$$

Once the L1 segment is identified, it may be loaded into memory and updated with the fingerprint in the reference cache at block 310. Parent nodes may be similarly updated until all of the nodes in the system include new references to the children nodes.

Finally, at block 312, the data segment may be stored as a L0, or leaf, node in the tree structure. The data segment may be written to persistent storage, such as persistent storage 104.

In some embodiments, loading the L1 segment and writing the reference cache entry may occur asynchronously. For example, the deduplicated storage may immediately begin searching for the L1 segment and loading it into memory when the new data segment is received. This may improve system performance by allowing the metadata segment to be located even while the offset and fingerprint are being written to the reference cache.

Additionally or alternatively, the L1 may not be loaded asynchronously. The reference cache may be flushed using any cache flushing algorithm, such as FIFO or LRU, and the L1 node may be located and updated when the entry is flushed.

In some embodiments, the present disclosure has the additional benefit of reducing processing time for hot offsets. For example, if the primary storage system is writing frequently to a particular offset, that offset will have many data segments transmitted to the deduplicated storage system. When the reference cache is updated to include the new offset/fingerprint, it may overwrite any previous entry associated with the same offset. This may enable the system to load the L1 metadata node once, rather than for each time the offset is updated.

Figure 3B:
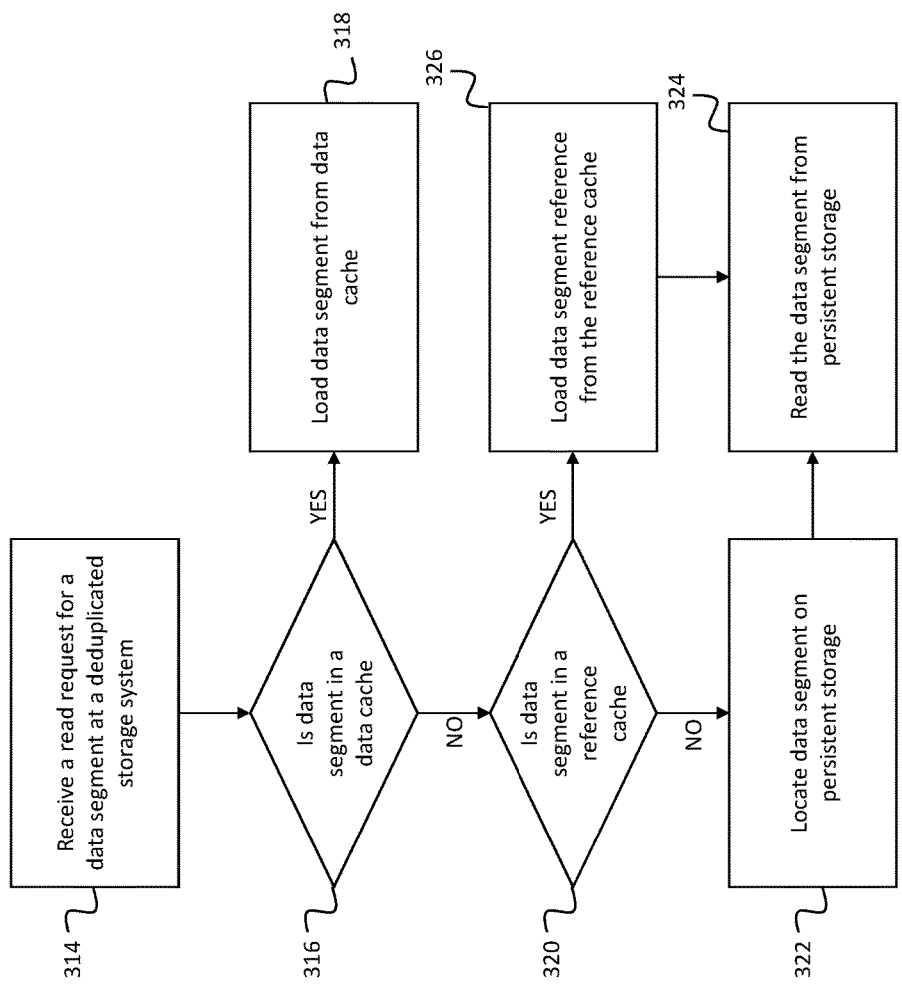
FIG. 3B depicts a process for optimizing data reads consistent with an embodiment of the present disclosure.

Turning now to FIG. 3B, a process for reading data segments from the system depicted in FIG. 1 is discussed. In some embodiments, these read requests may be part of a restore operation. For example, primary data system 100 may wish to recover data that became corrupt, inaccessible, or is otherwise lost.

At block 314, a read request may be received for a data segment stored on the deduplicated storage system. This read request could be part of a restore operation, and the data segment may comprise data to be restored to the primary storage system. In some embodiments, the read request is for a data segment that was previously backed up and/or is persistently stored on the deduplicated storage system. In some embodiments, the read request may include the fingerprint print of the requested data segment.

At block 316, a check is made to see if the data segment is in a data cache. The data cache could be, for example, substantially similar to data cache 108. In some embodiments, data cache 108 is used to temporarily store data segments during read and/or write operations. For example, a data segment may temporarily be placed in the data cache and associated with a fingerprint during a write operation. Similarly, a data segment may be loaded into the data cache after it is read from persistent storage as part of a read operation. This may be because the data segment will likely be requested an additional time in the near future, and caching the segment will reduce additional IOs to the persistent storage.

If the data segment is found in the data cache, it may be loaded from the cache at block 318. For example, the cache may comprise a hash table or other key/value data structures where the fingerprint is the key and the data segment is the value. The data segment may be loaded from the cache using its associated fingerprint. The data segment may then be returned to the primary storage and the process may terminate.

If the data segment is not found in the data cache, the process may continue to block 320. Block 320 may comprise a second check to determine whether the data segment fingerprint is stored in the reference cache. This check may be substantially similar to that discussed above in reference to FIG. 3A. For example, a data segment reference may be stored in the reference cache, where the data segment reference comprises {offset; finger_print}.

If the data segment is not found in the reference cache, the process may continue to block 322. At block 322, the deduplicated storage system may attempt to locate the data segment in persistent storage. This may involve multiple read operations to the persistent storage, which may reduce performance. For example, a metadata node, such as an L1 node, may need to be located in the persistent storage since it is not in the reference cache. The tree structure discussed in reference to FIG. 2 may be traversed until the L1 node is located and loaded from storage. This may involve issuing multiple read requests to the persistent storage. Once loaded, an additional read operation may be issued for the L0 node containing the data segment itself. This may be substantially similar to the bottle neck discussed above when overwriting data.

Once located, at block 324 the data segment may be loaded from the persistent storage. The data segment may then be returned to the primary storage for processing.

If, at block 320, the check determines there is a reference for the data segment in the reference cache, that data segment reference may be loaded at block 326. For example, the finger print for the data segment may be used to load the data segment reference and/or offset.

Finally, at block 324, the data segment may be loaded from persistent storage and/or returned the primary storage system. This may be done using the fingerprint for the data segment and/or the reference from the reference cache.

Figure 4:
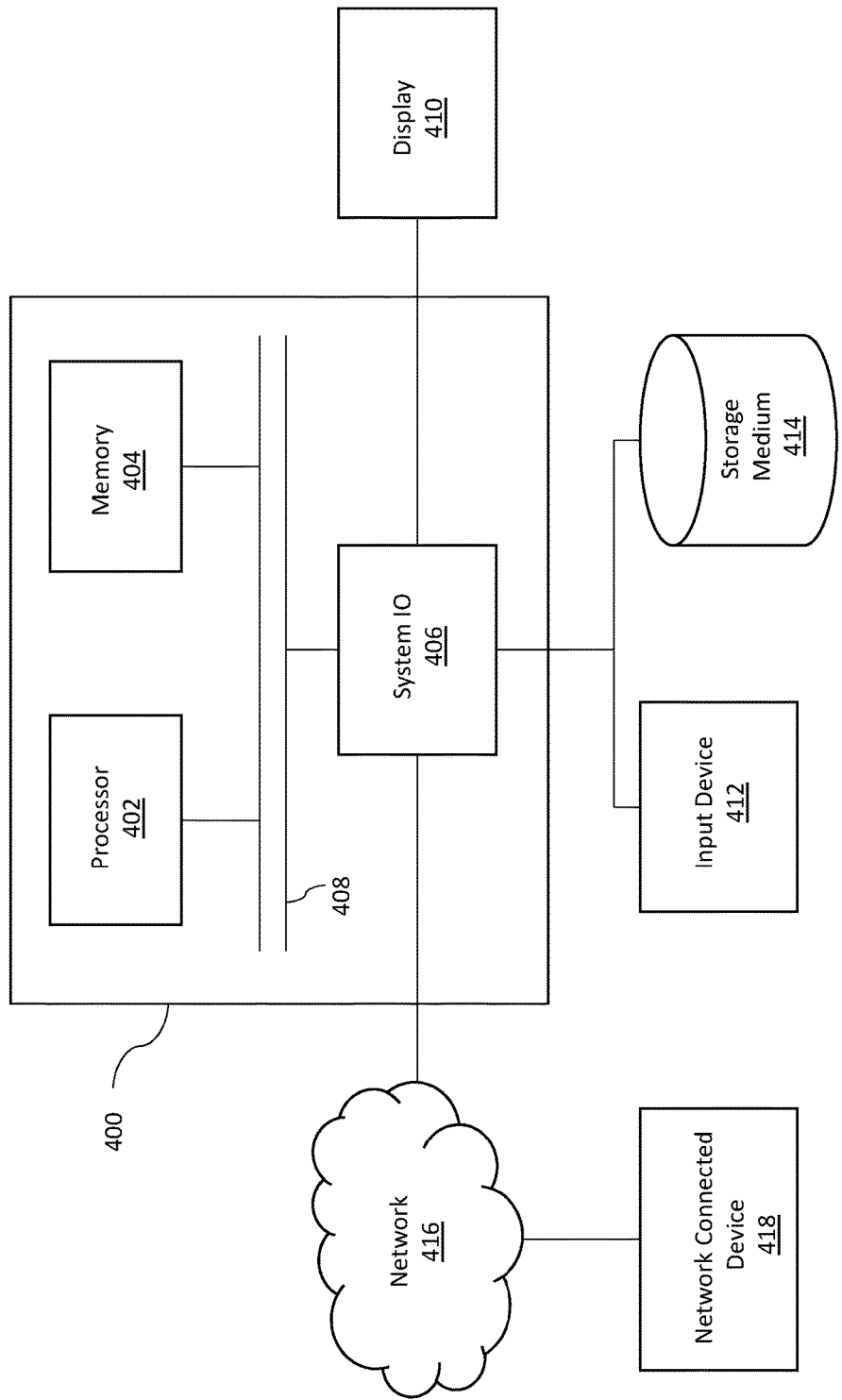
FIG. 4 depicts a general purpose computer system consistent with an embodiment of the present disclosure.

FIG. 4 depicts a computer system which may be used to implement different embodiments discussed herein. General purpose computer 400 may include processor 402, memory 404, and system 10 controller 406, all of which may be in communication over system bus 408. In an embodiment, processor 402 may be a central processing unit ("CPU") or accelerated processing unit ("APU"). Some embodiments may comprise multiple processors, or a processor with multiple cores. Processor 402 and memory 404 may together execute a computer process, such as the processes described herein.

System IO controller 406 may be in communication with display 410, input device 412, non-transitory computer readable storage medium 414, and/or network 416. Display 410 may be any computer display, such as a monitor, a smart phone screen, or wearable electronics and/or it may be an input device such as a touch screen. Input device 412 may be a keyboard, mouse, track-pad, camera, microphone, or the like, and storage medium 414 may comprise a hard drive, flash drive, solid state drive, magnetic tape, magnetic disk, optical disk, or any other computer readable and/or writable medium. Storage device 414 may also reside inside general purpose computer 400, rather than outside as shown in FIG. 1.

Network 416 may be any computer network, such as a local area network ("LAN"), wide area network ("WAN") such as the internet, a corporate intranet, a metropolitan area network ("MAN"), a storage area network ("SAN"), a cellular network, a personal area network (PAN), or any combination thereof. Further, network 416 may be either wired or wireless or any combination thereof, and may provide input to or receive output from IO controller 406. In an embodiment, network 416 may be in communication with one or more network connected devices 418, such as another general purpose computer, smart phone, PDA, storage device, tablet computer, or any other device capable of connecting to a network.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for optimizing backups, the method comprising:
   receiving a read request for a data segment at a deduplicated storage system;
   determining the data segment is not in a data cache on the deduplicated storage system;
   determining a data segment reference for the data segment is in a data segment reference cache on the deduplicated storage system; and
   reading the data segment from a persistent storage using the data segment reference.

2. A computer program product for optimizing backups, the computer program product comprising a non-transitory computer readable medium encoded with computer executable program, the code enabling:
   receiving a read request for a data segment at a deduplicated storage system;
   determining the data segment is not in a data cache on the deduplicated storage system;
   determining a data segment reference for the data segment is in a data segment reference cache on the deduplicated storage system; and
   reading the data segment from a persistent storage using the data segment reference.

3. A system for optimizing backups, the system comprising a computer processor configured to execute instructions comprising:
   receiving a read request for a data segment at a deduplicated storage system;
   determining the data segment is not in a data cache on the deduplicated storage system;
   determining a data segment reference for the data segment is in a data segment reference cache on the deduplicated storage system; and
   reading the data segment from a persistent storage using the data segment reference.

* * * * *